US012593899B2

(12) United States Patent
Zhao et al.

(10) Patent No.: US 12,593,899 B2
(45) Date of Patent: Apr. 7, 2026

(54) WRIST-WORN DEVICE

(71) Applicant: GOERTEK INC., Weifang (CN)

(72) Inventors: Cheng Zhao, Weifang (CN); Huaying Feng, Weifang (CN); Qingru Shao, Weifang (CN); Jianning Zhang, Weifang (CN)

(73) Assignee: GOERTEK INC., Weifang (CN)

( * ) Notice: Subject to any disclaimer, the term of this patent is extended or adjusted under 35 U.S.C. 154(b) by 288 days.

(21) Appl. No.: 18/405,056

(22) Filed: Jan. 5, 2024

(65) Prior Publication Data

US 2024/0130484 A1 Apr. 25, 2024
US 2024/0225209 A9 Jul. 11, 2024

Related U.S. Application Data

(63) Continuation of application No. PCT/CN2021/126327, filed on Oct. 26, 2021.

(30) Foreign Application Priority Data

Jul. 6, 2021 (CN) ......................... 202110765150.1

(51) Int. Cl.
*G04B 37/00* (2006.01)
*A44C 5/20* (2006.01)

(52) U.S. Cl.
CPC ........ *A44C 5/2071* (2013.01); *G04B 37/0008* (2013.01)

(58) Field of Classification Search
CPC .... G04B 37/14; G04B 37/00; G04B 37/0008; A44C 5/2071; A44C 5/0053; A44C 5/20; A44C 5/0007; A44C 5/14
See application file for complete search history.

(56) References Cited

U.S. PATENT DOCUMENTS 9,609,921 B1 4/2017 Feinstein
9,781,984 B2 * 10/2017 Baranski ................. A44C 5/20
(Continued)

FOREIGN PATENT DOCUMENTS

CH 518696 * 2/1972
CH 715066 A2 12/2019
(Continued)

OTHER PUBLICATIONS

First Office Action in Corresponding Chinese Application No. 202110765150.1, dated Apr. 29, 2022; 13 pgs.
(Continued)

*Primary Examiner* — Sean Kayes
(74) *Attorney, Agent, or Firm* — HAUPTMAN HAM, LLP

(57) ABSTRACT

Disclosed is a wrist-worn device, including a device body and a wristband. The wristband includes: a band body including two detachable ends; an installation part provided on the band body; and a memory metal wire in a shape of a long strip extending along a length direction of the band body. The band body is provided with a first installation cavity, the installation part is provided with a second installation cavity communicated with the first installation cavity, and the device body is provided in the second installation cavity; the memory metal wire is provided in the first installation cavity and passes through the second installation cavity; the memory metal wire is configured with a memory state of being annular in a natural state; and the device body is provided with a positioning groove extending along the length direction of the band body.

12 Claims, 7 Drawing Sheets

(56) References Cited

U.S. PATENT DOCUMENTS

| | | | | |
|---|---|---|---|---|
| 10,877,524 | B2 * | 12/2020 | Yoshitomi | H04M 1/72412 |
| 11,433,377 | B2 * | 9/2022 | Nagai | F01N 13/0093 |
| 11,974,640 | B2 * | 5/2024 | Zhang | A44C 5/0061 |
| 12,414,614 | B2 * | 9/2025 | Zhao | A44C 5/0053 |
| 2003/0181116 | A1 * | 9/2003 | Van Heerden | G06F 3/016 442/228 |
| 2015/0185764 | A1 * | 7/2015 | Magi | A41D 13/08 361/679.03 |
| 2016/0120048 | A1 | 4/2016 | Seo et al. | |
| 2016/0255944 | A1 | 9/2016 | Baranski et al. | |
| 2019/0101958 | A1 * | 4/2019 | Yoshitomi | G06F 1/1656 |

FOREIGN PATENT DOCUMENTS

| | | | | |
|---|---|---|---|---|
| CN | 203986448 | U | | 12/2014 |
| CN | 207020576 | U | | 2/2018 |
| CN | 209711778 | U | | 12/2019 |
| CN | 210143972 | U | | 3/2020 |
| CN | 111602938 | A | | 9/2020 |
| CN | 212697930 | U | | 3/2021 |
| CN | 213096516 | U | | 5/2021 |
| CN | 113425050 | A | | 9/2021 |
| CN | 113475828 | A | | 10/2021 |
| CN | 215837436 | U | | 2/2022 |
| JP | H01236004 | A | | 9/1989 |
| JP | H11239506 | A | | 9/1999 |
| JP | 2000300313 | A | | 10/2000 |
| JP | 2018-117903 | | * | 8/2018 |
| KR | 2009-0113348 | | * | 10/2009 |

OTHER PUBLICATIONS

International Search Report and Written Opinion in Corresponding International Application No. PCT/CN2021/126327, mailed Mar. 21, 2022; 17 pgs.

Notification to Grant in Corresponding Chinese Application No. 202110765150.1, dated Mar. 24, 2023; 3 pgs.

Second Office Action in Corresponding Chinese Application No. 202110765150.1, dated Dec. 5, 2022; 12 pgs.

* cited by examiner

WRIST-WORN DEVICE

CROSS-REFERENCE TO RELATED APPLICATIONS

This application is a continuation application of International Application No. PCT/CN2021/126327, filed on Oct. 26, 2021, which claims priority to Chinese Patent Application No. 202110765150.1, filed on Jul. 6, 2021. The disclosures of the above-mentioned applications are incorporated herein by reference in their entireties.

TECHNICAL FIELD

The present application relates to the technical field of wrist-worn device, and in particular to a wrist-worn device.

BACKGROUND

With the development of electronic technology, wrist-worn devices are becoming more and more popular. Wrist-worn devices generally include a device body and a flexible wristband. The device body is used to display image information to the user, and the wristband is used to wear the device body on the user's wrist or ankle. In existing wrist-worn devices, since flexible wristbands have no supporting effect or blocking effect, it is usually necessary to provide a wristband buckle on one wristband and multiple adjustment holes on another wristband. The wristband buckle matches with the adjustment holes to connect the two wristbands so that the wrist-worn device can be stably worn on the user's wrist. However, this wearing method requires the user to buckle or unlock the wristband buckle during the process of wearing and removing the wrist-worn device, which is inconvenient to operate and greatly affects the user's experience.

SUMMARY

The main objective of the present application is to provide a wrist-worn device that enables users to easily and quickly put the wrist-worn device on or take off the wrist, thereby improving the user's experience.

In order to achieve the above object, the present application provides a wrist-worn device including a device body and a wristband, and the wristband includes: a device body and a wristband.

The wristband includes a band body including two detachable ends, an installation part provided on the band body, and a memory metal wire in a shape of a long strip extending along a length direction of the band body.

The band body is provided with a first installation cavity.

The installation part is provided with a second installation cavity communicated with the first installation cavity, and the device body is provided in the second installation cavity.

The memory metal wire is provided in the first installation cavity and passes through the second installation cavity.

The memory metal wire is configured with a memory state of being annular in a natural state, so that the band body naturally maintains an annular shape, and the wristband naturally maintains a wearing state.

The device body is provided with a positioning groove extending along the length direction of the band body, and the memory metal wire is correspondingly installed in the positioning groove.

In an embodiment, two memory metal wires are provided, the device body is provided with two positioning grooves spaced apart in a width direction of the band body, and the two memory metal wires are installed in the two positioning grooves in one-to-one correspondence.

In an embodiment, the device body is provided with a first body surface, a second body surface opposite to the first body surface, a first side surface and a second side surface opposite to the first side surface, when the wristband is in the wearing state, the first body surface or the second body surface is an inner side surface;

- the two positioning grooves are respectively recessed on opposite sides of the first body surface; or
- the two positioning grooves are respectively recessed on opposite sides of the second body surface; or
- the two positioning grooves are respectively recessed on the first side surface and the second side surface; or
- the two positioning grooves are hole-shaped grooves that run through the device body along the length direction of the band body, and the two positioning grooves are respectively provided close to the first side surface and the second side surface.

In an embodiment, an inner surface of the first installation cavity and/or an outer surface of the memory metal wire is provided with a coating.

In an embodiment, the first installation cavity runs through one end of the band body, the wristband is further provided with a cap, and the cap is installed on the end of the band body run by the first installation cavity.

In an embodiment, the ends of the memory metal wire are provided in a spherical or spherical-like shape; and/or

- the cap is formed with an installation groove for adapting and accommodating the spherical or spherical-like end of the memory metal wire.

In an embodiment, the band body is provided with a first surface and a second surface opposite to the first surface, and the wearing state includes a first wearing mode of configuring the first surface as an inner annular surface and a second wearing mode of configuring the second surface as the inner annular surface;

- reverse force is applied to the band body to make the band body switch between the first wearing mode and the second wearing mode.

In an embodiment, the installation part is further provided with an opening communicated with the second installation cavity.

In an embodiment, the installation part includes a fabric layer connected to the band body and a first soft rubber film layer attached to the fabric layer, and the opening is an incision penetrating through the first soft rubber film layer and the fabric layer sequentially.

In an embodiment, the band body includes a fabric body and a second soft rubber film layer provided inside the fabric body; and/or the second soft rubber film layer is provided with ventilation holes.

In an embodiment, the device body is configured as a watch body or a health monitoring module.

In the technical solution of the present application, the band body has detachable two ends, and the memory metal wire has a memory state of being annular in a natural state, so that the band body naturally maintains an annular shape, and the wristband naturally maintains in the wearing state. As such, on the one hand, the wristband buckle and its related connection structures can be saved, thereby saving material costs and assembly costs; on the other hand, the user does not need to align the wristband buckle when wearing it, and can remove the wristband without unbuckling, which allows users to quickly and easily put on or take off the wrist-worn device on the wrist, thus improving the user experience. In addition, the device body is provided with a positioning groove extending along the length direction of the band body, and the memory metal wire is correspondingly installed in the positioning groove to limit the deflection of the memory metal wire and improve the structure stability of the wristband. When there are two memory metal wires, the device body is provided with two positioning grooves to prevent the two memory metal wires from coming close to each other in the width direction of the band body during use, thereby ensuring that the two memory metal wires can provide support for the opposite sides of the band body, especially when the band body is made of fabric. It can be understood that fabric needs more support than soft rubber and hard rubber.

BRIEF DESCRIPTION OF THE DRAWINGS

In order to more clearly illustrate the technical solutions in the embodiments of the present application or in the related art, drawings used in the embodiments or in the related art will be briefly described below. Obviously, the drawings in the following description are only some embodiments of the present application. It will be apparent to those skilled in the art that other figures can be obtained according to the structures shown in the drawings without creative work.

Figure 1:
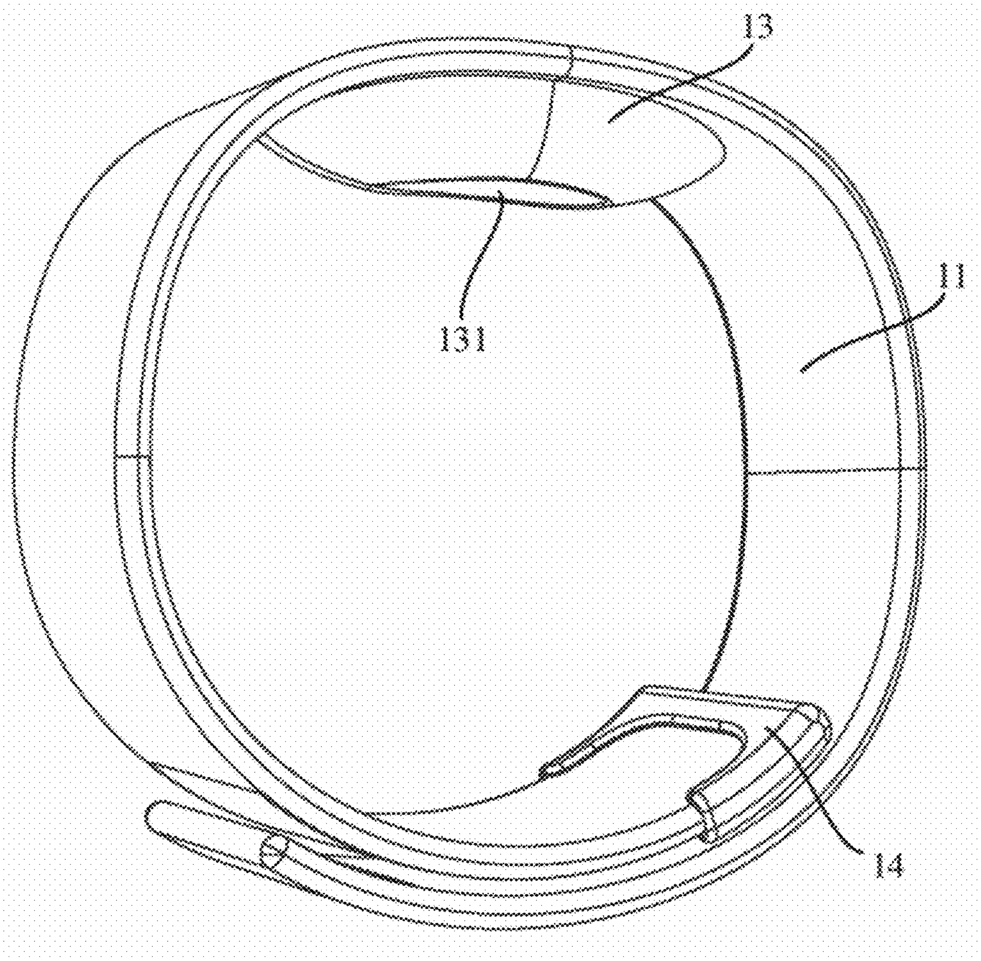
FIG. 1 is a schematic structural view of a wrist-worn device according to an embodiment of the present application.

The realization of the purpose, functional features and advantages of the present application will be further described with reference to the embodiments and the accompanying drawings.

DETAILED DESCRIPTION OF THE EMBODIMENTS

The technical solutions in the embodiments of the present application will be clearly and completely described below with reference to the drawings in the embodiment of the present application. Obviously, the described embodiments are only a part of the embodiments of the present application, not all of the embodiments. Based on the embodiments in the present application, all other embodiments perceived by those ordinary skills in the art without creative effort should be fallen within the protection scope of the present application.

It should be noted that all of the directional instructions in the embodiments of the present application (such as, up, down, left, right, front, rear) are only used to explain the relative position relationship and movement of each component under a specific attitude (as shown in the drawings), if the specific attitude changes, the directional instructions will change correspondingly.

Besides, the descriptions in the present application that refer to "first," "second," etc. are only for descriptive purposes and are not to be interpreted as indicating or implying relative importance or to implicitly indicate the number of technical features indicated. Thus, a feature defined as "first" or "second" may explicitly or implicitly include at least one of the feature. In addition, the meaning of "and/or" appearing in the entire text is to include three parallel solutions. For example, "A and/or B" includes only A, or only B, or both A and B. In addition, technical solutions between the embodiments can be combined with each other, but must be based on the realization of the technical solutions by those skilled in the art, and when the technical solutions are contradictory to each other or cannot be realized, the technical solutions should be considered that the combination does not exist, and the technical solutions are not fallen within the protection scope claimed in the present application.

Figure 2:
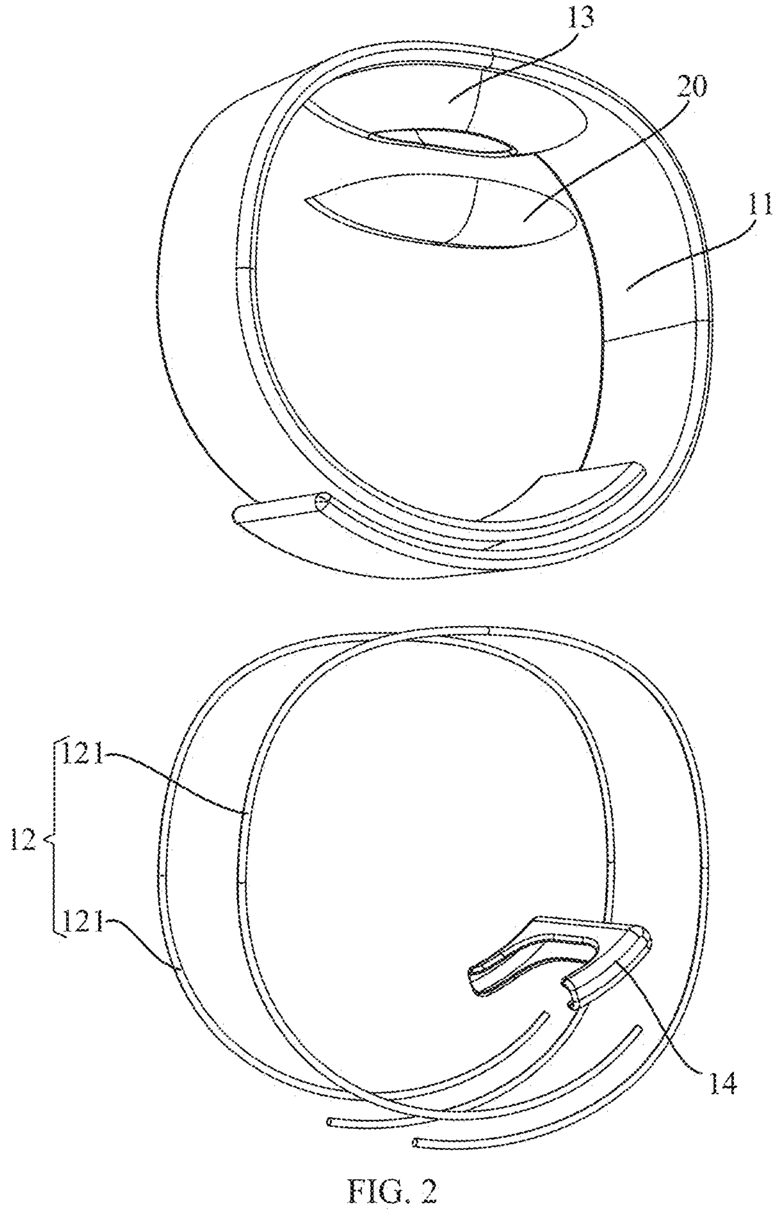
FIG. 2 is a schematic exploded structural view of the wrist-worn device in FIG. 1.
Figure 3A:
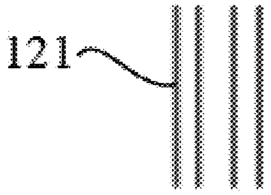
FIGS. 3(*a*)-3(*e*) are schematic structural views of various memory metal parts of a wristband of the wrist-worn device of the present application on a parent phase plane.
Figure 3B:
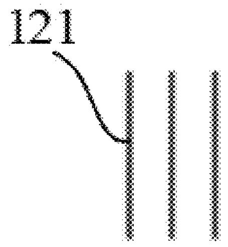
Figure 3C:
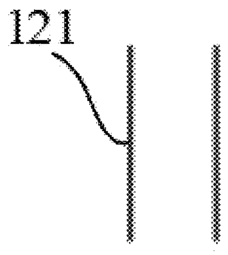
Figure 3D:
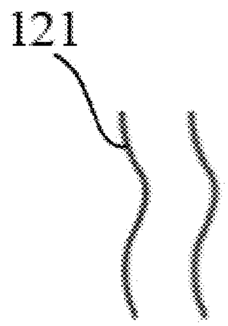
Figure 3E:
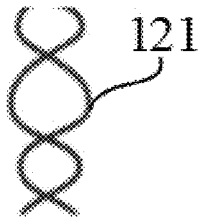

The present application provides a wrist-worn device. As shown in FIGS. 1 and 2, the wrist-worn device usually includes a wristband and a device body 20 provided on the wristband. The device body 20 can be a watch body (for example, it can be an ordinary watch dial), it can be a smart watch dial, or the main body of a bracelet, etc.), or it can be a health monitoring module (generally refers to a watch body without a screen display function, for example, it can be equipped with monitoring sensors to monitor the user's heart rate, blood pressure, etc., or it can be equipped with sensors that monitor movement status, number of walking steps, etc.). In the present application, the wristband has an annular wearing state, and the wearing state can be maintained naturally. That is, the wristband can maintain the annular state even in the non-wearing state. In an embodiment, the device body 20 is provided in the middle of the wristband. In other embodiments, the device body 20 may also be slightly offset from the middle position.

It should be noted that the annular wearing state of the wristband in the present application means that the wristband has only one form in its natural state, that is, it will only naturally maintain the annular state, which is different from the snap ring. The snap ring may have two forms in its natural state, one is a straight shape, and the other is an arc (circle) shape. The straight shape of the snap ring can transform into an arc (circle) shape to achieve wearing after tapping the wrist. It should be noted that in the present application, the wristband "will only naturally maintain the annular state" does not limit the deformation ability of the wristband. At least, under the action of external force, the two ends of the wristband may be deformed and opened outwards, so that the user can wear or remove the wrist-worn device on the wrist. When the external force disappears, the deformation of the wristband can self-recover and return to the arc-shaped wearing state.

As shown in FIGS. 1 and 2, in one embodiment of the present application, the wristband includes a band body 11 and a memory metal part 12 provided on the band body 11, wherein the band body 11 comprises two detachable ends, the memory metal part 12 has a memory state of being annular in a natural state, so that the band body 11 naturally maintains an annular shape, and the wristband naturally maintains a wearing state. As such, on the one hand, the wristband buckle and its related connection structures can be saved, thereby saving material costs and assembly costs; on the other hand, the user does not need to align the wristband buckle when wearing it, and can remove the wristband without unbuckling, which allows users to quickly and easily put on or take off the wrist-worn device on the wrist, thus improving the user experience.

It can be understood that memory metal has super elasticity, which means that under the action of external force, the memory metal has a much greater deformation recovery ability than ordinary metal, that is, the large strain generated during the loading process (such as the wearing process/removal process) will be removed by unloading, thereby recovering to the (annular) memory shape.

In one embodiment, when the wristband is in the wearing state, there is a gap between the two ends of the band body 11. However, the present design is not limited to this. In other embodiments, when the wristband is in the wearing state, the two ends of the band body 11 are stacked (as shown in FIG. 1); in other embodiments, when the wristband is in the wearing state, the two ends of the band body 11 are offset and parallel; in other embodiments, when the wristband is in the wearing state, the two ends of the band body 11 are in contact with each other.

Figure 5:
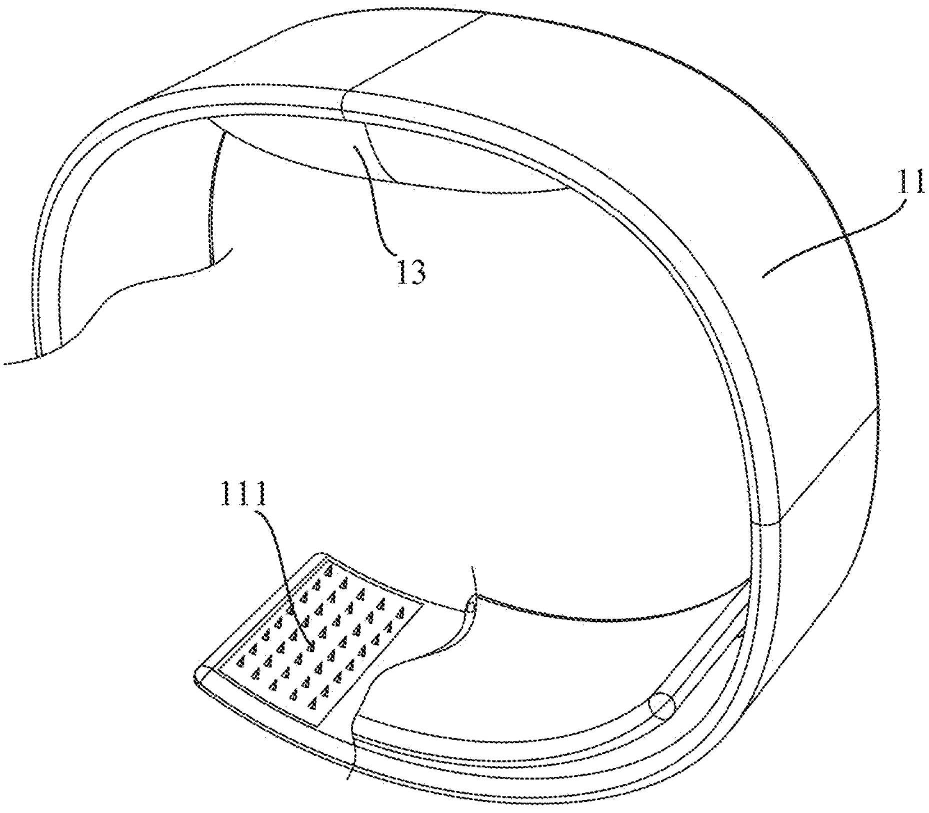
FIG. 5 is a schematic structural view of protrusions on the band body of the wristband of the wrist-worn device according to the present application.

In an embodiment, as shown in FIG. 5, when the two ends of the band body 11 are stacked, at least one of the two opposite surfaces of the stacked two ends is provided with protrusions 111, and these protrusions 111 can be flat point, thorn, or barb. It can be understood that the addition of the protrusions 111 can increase the friction force between the two opposite surfaces of the stacked two ends, and reduce the probability of displacement between the stacked two ends along the length direction of the band body 11, thereby improving the wearing stability of the wristband. In particular, because the addition of the protrusions increases the friction force when sliding displacement occurs between the two opposite surfaces, and will not increase the connection force between the stacked two ends in a direction perpendicular to the outer surface of the band body 11 (the present Velcro mainly increases the connection force), that is, when the two ends of the band body 11 are pulled outward (force is applied nearly perpendicular to the outer surface of the band body 11) when the wristband is worn or removed, the protrusions 111 will not cause any obstruction, thereby not causing additional labor to the wearing and removal of the wristband.

Especially for the thorn-like or barb-like protrusions 111, in an embodiment, the protrusions 111 are soft rubber protrusions. During the wearing process, due to the violent shaking of the wrist by the user, a vertical extrusion force and horizontal relative displacement inertia will be generated between the stacked two ends of the wristbands. The vertical extrusion force will squeeze the soft rubber protrusion in a vertical direction, and the relative displacement inertia in the horizontal direction will stretch the soft rubber protrusions in a horizontal direction, thereby increasing the contact area between the soft rubber protrusions and the opposite side wristband and/or another set of soft rubber protrusions provided on the opposite side wristband, and increasing the friction between the stacked two ends of the wristbands, preventing the stacked two ends of the wristbands from being staggered, thereby preventing the wristbands from slipping off the wrist. In an embodiment, the soft rubber protrusions are provided on the two opposite surfaces of the stacked two ends. When the wristband is worn and shaken on the wrist, the vertical extrusion force and the horizontal relative displacement inertia cause the two set of soft rubber protrusions to be extruded and deformed, thereby being rubbered and entangled together, making the wristband more stable and secure to wear. Therefore, the wristband of the present application does not require the assistance of a wristband buckle and does not need to worry about slipping.

In other embodiments of the present application, soft rubber or hard rubber material may also be used for the point-shaped protrusions 111.

Therefore, the memory metal part 12 of the present application can realize the stable support and wearing of the wrist-worn device on the user's wrist without the need for the wristband buckle to be fastened; the protrusion 111 at the end of the band body 11 can prevent the two ends of the band body 11 from being misaligned, thereby preventing the wristband ring from becoming larger and slipping from the wrist, which further increases the wearing stability. In addition, the configuration of the memory metal part 12 and the protrusion 111 also avoiding buckle operation during the wearing process and unbuckle operation during removal process for the traditional wrist-worn device, which makes the wearing and removal process easier.

In an embodiment, the band body 11 is provided with a first installation cavity, and the memory metal part 12 is accommodated and installed in the first installation cavity. That is, the memory metal part 12 is provided in the band body 11 to provide physical protection for the memory metal part 12 through the band body 11.

In an embodiment, the memory metal part 12 includes a memory metal wire 121 and/or a memory metal sheet. In order to save materials, the memory metal part 12 usually uses memory metal wires 121 or memory metal narrow sheets. As shown in FIGS. 3(*a*), 3(*b*), and 3(*c*), in one embodiment, the memory metal part 12 includes a plurality of parallel long strip-shaped memory metal parts (wire-shaped or narrow sheet-shaped). The memory metal pieces are in the shape of a strip extending along the length direction of the band body 11, and at least two of the memory metal pieces are respectively provided close to opposite sides of the band body 11. In another embodiment, the memory metal part 12 includes a long strip of memory metal part (wire-shaped or narrow sheet-shaped), which is continuously bent in the parent phase plane and is provided with a plurality of bent parts, and then it is bent into a ring shape with one side of the parent phase plane as the inner side. As shown in FIG. 3(*d*), in yet another embodiment, the memory metal part 12 includes two long strip memory metal pieces (wire-shaped or narrow sheet-shaped), each memory metal piece has at least one bent part in the parent phase plane, and is then bent into a ring shape with one side of the parent phase plane as the inner side, and the bent parts of the two memory metal parts do not intersect. As shown in FIG. 3(*e*), in another embodiment, the memory metal part 12 includes two long strip memory metal pieces (wire-shaped or narrow sheet-shaped), each memory metal piece is continuously bent in the parent phase plane and is provided with a plurality of bent parts, and is bent into a ring shape with one side of the parent phase plane as the inner side, and the bent parts of the two memory metal parts intersect.

In an embodiment, as shown in FIG. 1 and FIG. 2, the first installation cavity runs through one end of the band body 11, and the wristband is further provided with a cap 14. The cap 14 is provided on the end of band body 11 run through by the first installation cavity. It can be understood that the other end of the band body 11 can be closed, that is, the first installation cavity does not run the other end of the band body 11, so that only one cap 14 is needed. In an embodiment, the configuring of the cap 14 can prevent the memory metal part 12 from being exposed and prevent the memory metal part 12 from falling out. In an embodiment, the material of the cap 14 can be soft rubber, hard rubber or metal. Further, in an embodiment, the connection method between the cap 14 and the band body 11 may be, but is not limited to, thermal compression connection, adhesive connection, etc.

In an embodiment, when the memory metal part 12 is configured as a memory metal wire 121, the end of the memory metal wire 121 is provided in a spherical or spherical-like shape to reduce the sharpness of the end of the memory metal wire 121 and reduce the probability that the end of the memory metal wire 11 passes through the band body 11. It can be understood that the spherical or spherical-like structure at the end of the memory metal wire 121 is thickened, that is, the diameter of the spherical or spherical-like structure is larger than the diameter of the memory metal wire 121.

Figure 4:
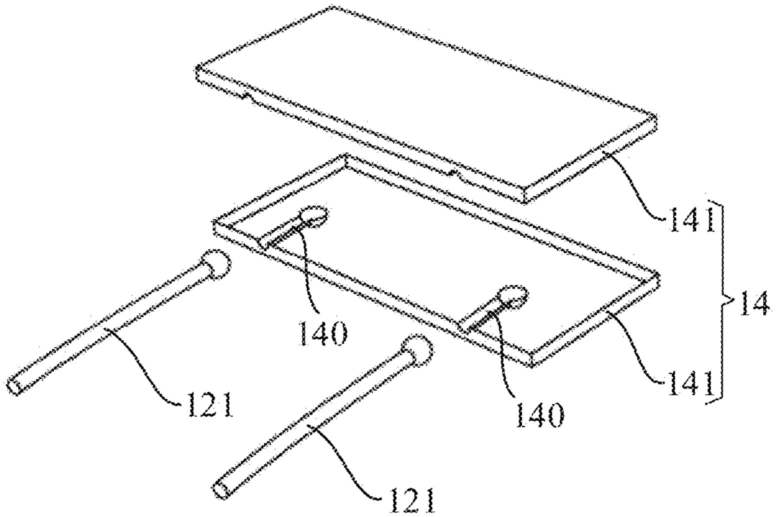
FIG. 4 is a schematic structural view of a connection between the memory metal wire and a cap of the wristband of the wrist-worn device according to an embodiment of the present application.

In an embodiment, the cap 14 is formed with an installation groove 140 for adapting and accommodating the spherical or spherical-like end of the memory metal wire 121, so as to prevent the end of the memory metal wire 121 from breaking away from the cap 14 and reduce the sliding of the memory metal wire 121 relative to the first installation cavity. Further, in an embodiment, as shown in FIG. 4, the cap 14 is in the shape of a clamping and includes two opposite clamping parts 141. Each surface of the clamping part 141 facing the other clamping part 141 is provided with a half installation groove 140.

In an embodiment, as shown in FIGS. 1 and 2, the wristband further includes an installation part 13 provided on the band body 11. The installation part 13 is used for installing the device body 20 to facilitate the connection between the device body 20 and the wristband. In an embodiment, a second installation cavity is provided in the installation part 13, and the second installation cavity is used for accommodating the device body 20 to install, thereby improving the stability and reliability of installation of the device body 20. In an embodiment, the installation part 13 is further provided with an opening communicated with the second installation cavity. The opening 131 is not only for passing through the device body 20 to install and uninstall, but also for a display area to be visible when the device body 20 is provided with the display area. In addition, the opening 131 is further for a detection probe to extend when the equipment body 20 has a detection probe.

In an embodiment, the installation part 13 includes a fabric layer connected to the band body 11 and a first soft rubber film layer attached to the fabric layer. The opening 131 is an incision that runs through the first soft rubber film layer and the fabric layer sequentially. It can be understood that the configuration of the first soft rubber film layer can make the fabric layer hard, thereby facilitating the cutting process of the opening 131, and in particular, can avoid the phenomenon of fabric spinning during cutting. In an embodiment, the material of the band body 11 is generally fabric. In this way, the fabric layers of the band body 11 and the installation part 13 can be woven at one time, which facilitates processing.

In the above embodiments, the material of the band body 11 is usually made of fabric; however, the present design is not limited thereto. In other embodiments, in addition to fabric, the material of the band body 11 may also be made of, but is not limited to, soft rubber and/or hard rubber, etc. It should be noted that the band body 11 can be made of a single fabric or a single soft rubber or a single hard rubber (especially, when the material of the band body 11 is a single hard rubber, the band body 11 is in the shape of a long sheet and has sufficient bending flexibility). The band body 11 can also be made of two or more materials. For example, the band body 11 may include a band-shaped fabric body and a soft rubber edge covering the edge of the fabric body. The fabric body has better air permeability, and the soft rubber edge can provide better shaping effect, and can prevent the edge of the fabric body from coming off the line and reduce the dirt on the edge of the band body 11 (compared to fabric, soft rubber is not easy to get dirty, and even if it is dirty, it is easy to scrub). In an embodiment, a second soft rubber film layer can also be provided on the inside of the fabric to isolate sweat and the like through the second soft rubber film layer and reduce the probability of the fabric body being stained by sweat and the like. In an embodiment, ventilation holes are provided on the second soft rubber film layer, which is conducive to ensuring good air permeability of the band body 11.

Figure 7:
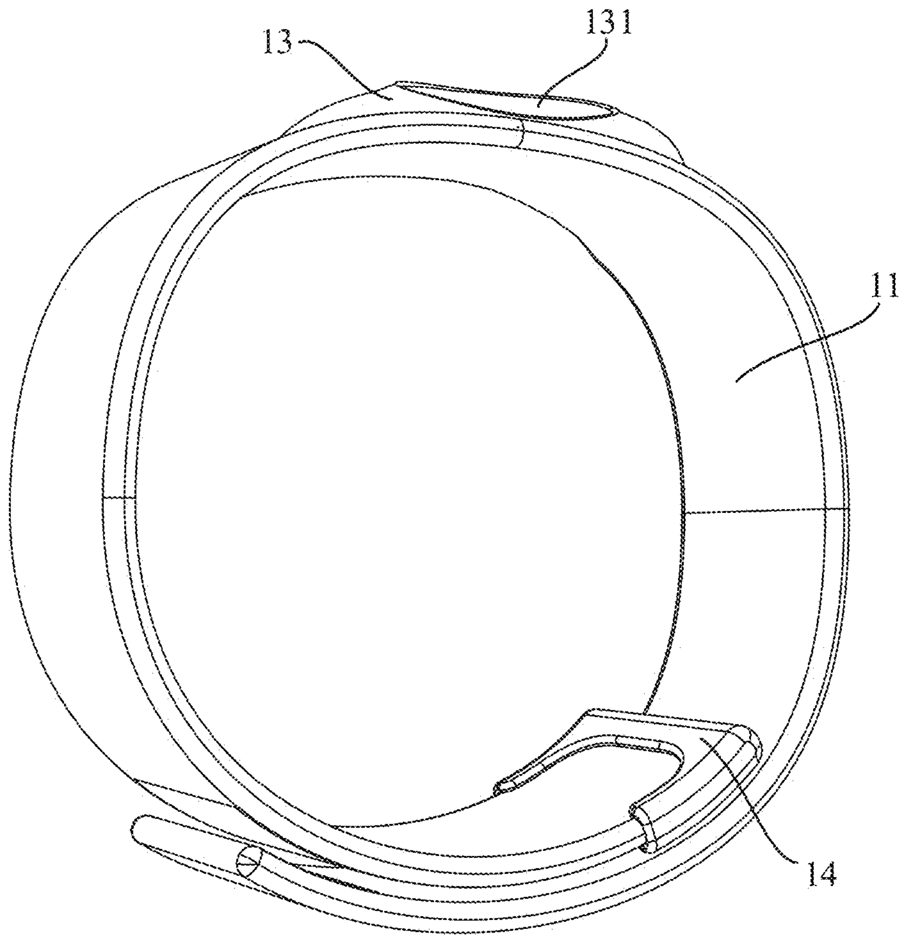
FIG. 7 is a schematic structural view of the wrist-worn device according to another embodiment of the present application.

In an embodiment, the band body 11 includes a first band surface and a second band surface opposite to the first band surface, and the wearing state includes a first wearing mode of configuring the first surface as the inner annular surface (as shown in FIG. 1) and the second wearing method with the second band surface as the inner annular surface (as shown in FIG. 7). The memory metal part 12 is a strip-shaped memory metal wire 121 extending along the length direction of the band body 11, the memory metal wire 121 is provided in the band body 11, so that the band body 11 can switch between the first wearing mode and the second wearing mode. Therefore, the first band surface and the second band surface adopt different design styles (such as different colors, patterns, etc.), and the product of the present application can present two wearing styles by wearing it in the forward direction or in the reverse direction.

It can be understood that the memory metal wire 121 is not adhered to the inner surface of the first installation cavity. Therefore, when a reverse force is applied (a force opposite to the bending direction of the band body 11 is defined as a reverse force) on the band body 11/memory metal part 12, the memory metal wire 121 can rotate freely when driven by external force. In this way, when the band body 11 is in the first wearing mode, the user can flip the band body 11 backward, and under the action of the flipping force, the memory metal wire 121 rotates freely in the first installation cavity, so that the band body 11 can be switched to the second wearing mode; vice versa.

It should be noted that in the above embodiments provided with the cap 14, the cap 14 does not only includes a protective effect, since the cap 14 is provided on the end of the memory metal wire 121, therefore, the spherical or spherical-like end of the memory metal wire 121 is also non-adhesive to the inner surface of the installation groove 140 on the cap 14. In order to further ensure that when an external force is applied to the band body 11/memory metal part 12, the memory metal wire 121 can rotate freely when driven by the external force, thereby ensuring that the band body 11 can be flipped backward.

In other embodiments of the present application, the cap 14 may not be provided, as long as the end of the memory metal wire 121 is not fixed, and the memory metal wire 121 is ensured to rotate freely without restriction.

The wristband provided in this embodiment can be worn forward or backward, which can enrich the use functions of the wrist-worn device with the wristband. For example, but not limited to, for a device body 20 that only has a display area on one side, when worn forward, the display area can be exposed, and when worn backward, the display area can be hidden to avoid leakage of display content. For the device body 20 with monitoring probes on both sides, when worn in the forward direction, the monitoring probe on the opposite side can be attached to the skin for measurement, and when worn in the reverse direction, the monitoring probe on the front side can be attached to the skin for measurement.

In an embodiment, the inner surface of the first installation cavity and/or the outer surface of the memory metal wire 121 is provided with a coating. In an embodiment, the coating provided on the outer surface of the memory metal wire 121 can be provided as a smooth coating, such as but not limited to Teflon coating, Nano ceramic coating or tungsten carbide coating, etc., so as to make the surface of the memory metal wire 121 be smooth, which is conducive to its free rotation and facilitates switching between the two wearing methods without scratching the inner wall of the band body 11 and extends the service life of the band body 11. On the other hand, the coating can prevent the memory metal wire 121 from being corroded, and extend the service life of the memory metal wire 121. In an embodiment, the coating on the inner surface of the first installation cavity is also provided as a smooth coating to facilitate smooth insertion of the memory metal wire 121 and improve assembly efficiency.

In an embodiment, the first installation cavity is communicated with the second installation cavity; the memory metal wire 121 passes through the second installation cavity; the device body 20 has a positioning groove 21 extending along the length direction of the band body 11. The memory metal wire 121 is correspondingly installed in the positioning groove 21 to limit the deflection of the memory metal wire 121 and make the structure of the wristband more stable.

In an embodiment, two memory metal wires 121 are provided; the device body 20 is provided with two positioning grooves 21 spaced apart in the width direction of the band body 11, and the two memory metal wires 121 are installed in the two positioning grooves 21 in one-to-one correspondence to prevent the two memory metal wires 121 from approaching each other in the width direction of the band body 11 during use. Therefore, the two memory metal wires 121 are ensured to provide support for the opposite sides of the band body 11, especially when the material of the band body 11 is fabric, it can be understood that fabric needs more support than soft rubber and hard rubber.

It should be noted that in the above embodiment with the cap 14, two installation grooves 140 in the cap 14 are also provided at intervals in the width direction of the band body 11 to adapt and accommodate install the spherical or spherical-like end of the two metal wires 121.

Figure 6A:
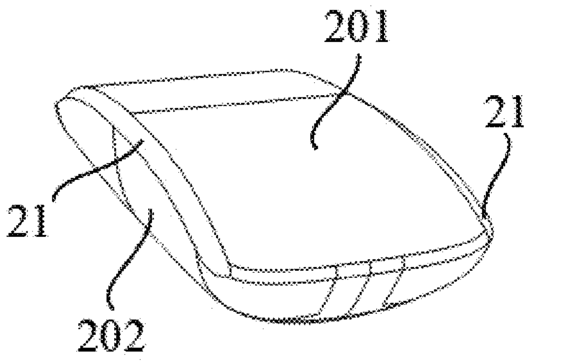
FIGS. 6(*a*)-6(*c*) are schematic structural views of various device bodies of the wrist-worn device of the present application.
Figure 6B:
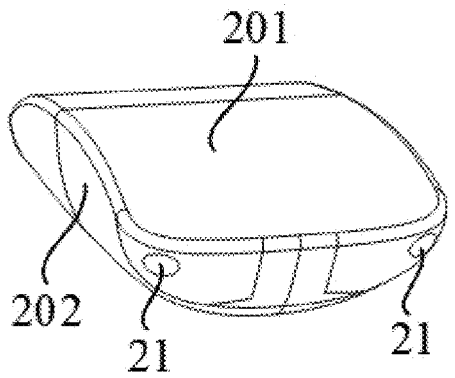
Figure 6C:
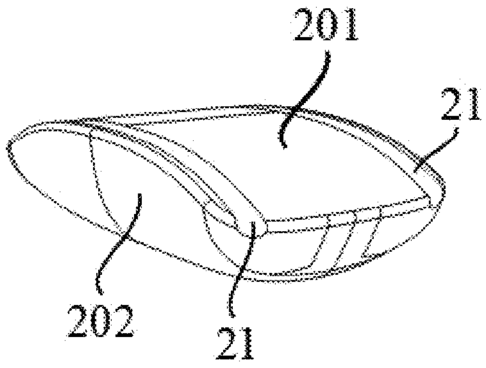

In an embodiment, the device body 20 has a first body surface 201 and a second body surface opposite to the first body surface 201, and a first side surface and a second side surface opposite to the first side surface. In the wearing state, the first body surface 201 or the second body surface 201 is configured as the inner side surface. In an embodiment, as shown in FIG. 6(*b*), the two positioning grooves 21 are hole-shaped grooves that run through the device body 20 along the length direction of the band body 11, and the two positioning grooves 21 are respectively provided in the first side surface 202 and the second side surface. However, the present application is not limited to this, as shown in FIG. 6(*c*), in another embodiment, the two positioning grooves 21 can also be respectively recessed on the opposite sides of the first body surface 201; and in yet another embodiment, the two positioning grooves 21 can also be respectively recessed on the opposite sides of the second body surface. In another embodiment, the two positioning grooves 21 can also be recessed on the first side surface 202 and the second side surface respectively. For example, as shown in FIG. 6(*a*), one of the positioning grooves 21 is recessed in the corner of the first side surface 202 close to the first body surface 201, and the other positioning groove 21 is recessed in corner of the second side surface close to the first body surface 201.

The above are only some embodiments of the present application, and do not limit the scope of the present application thereto. Under the inventive concept of the present application, equivalent structural transformations made according to the description and drawings of the present application, or direct/indirect application in other related technical fields are included in the scope of the present application.

What is claimed is:

1. A wrist-worn device, comprising:
a device body; and
a wristband, wherein the wristband comprises:
  a band body comprising two detachable ends;
  an installation part provided on the band body; and
  a memory metal wire in a shape of a long strip extending along a length direction of the band body, wherein
    the band body is provided with a first installation cavity;
    the installation part is provided with a second installation cavity communicated with the first installation cavity, and the device body is provided in the second installation cavity;
    the memory metal wire is provided in the first installation cavity and passes through the second installation cavity;
    the memory metal wire is configured with a memory state of being annular in a natural state, so that the band body naturally maintains an annular shape, and the wristband naturally maintains a wearing state; and
    the device body is provided with a positioning groove extending along the length direction of the band body, and the memory metal wire is correspondingly installed in the positioning groove.

2. The wrist-worn device according to claim 1, wherein two memory metal wires are provided, the device body is provided with two positioning grooves spaced apart in a width direction of the band body, and the two memory metal wires are installed in the two positioning grooves in one-to-one correspondence.

3. The wrist-worn device according to claim 2, wherein the device body is provided with a first body surface, a second body surface opposite to the first body surface, a first side surface and a second side surface opposite to the first side surface, when the wristband is in the wearing state, the first body surface or the second body surface is an inner side surface;
  the two positioning grooves are respectively recessed on opposite sides of the first body surface; or
  the two positioning grooves are respectively recessed on opposite sides of the second body surface; or
  the two positioning grooves are respectively recessed on the first side surface and the second side surface; or
  the two positioning grooves are hole-shaped grooves that run through the device body along the length direction of the band body, and the two positioning grooves are respectively provided close to the first side surface and the second side surface.

4. The wrist-worn device according to claim 1, wherein an inner surface of the first installation cavity and/or an outer surface of the memory metal wire is provided with a coating.

5. The wrist-worn device according to claim 1, wherein the first installation cavity runs through one end of the band body, the wristband is further provided with a cap, and the cap is installed on the end of the band body run by the first installation cavity.

6. The wrist-worn device according to claim 5, wherein:

the ends of the memory metal wire are provided in a spherical or spherical-like shape; and/or the cap is formed with an installation groove for adapting and accommodating the spherical or spherical-like end of the memory metal wire.

7. The wrist-worn device according to claim 1, wherein the band body is provided with a first surface and a second surface opposite to the first surface, and the wearing state comprises a first wearing mode of configuring the first surface as an inner annular surface and a second wearing mode of configuring the second surface as the inner annular surface;

reverse force is applied to the band body to make the band body switch between the first wearing mode and the second wearing mode.

8. The wrist-worn device according to claim 1, wherein when the wristband is in the wearing state, two ends of the band body are stacked, and at least one of two opposite surfaces of the stacked two ends is provided with protrusions.

9. The wrist-worn device according to claim 1, wherein the installation part is further provided with an opening communicated with the second installation cavity.

10. The wrist-worn device according to claim 9, wherein the installation part comprises a fabric layer connected to the band body and a first soft rubber film layer attached to the fabric layer, and the opening is an incision penetrating through the first soft rubber film layer and the fabric layer sequentially.

11. The wrist-worn device according to claim 1, wherein:

the band body comprises a fabric body and a second soft rubber film layer provided inside the fabric body; and/or the second soft rubber film layer is provided with ventilation holes.

12. The wrist-worn device according to claim 1, wherein the device body is configured as a watch body or a health monitoring module.

* * * * *